Jan. 18, 1927.  1,614,693

R. W. SCHULTE

SELF COMPENSATING FAN BELT

Original Filed May 15, 1925

INVENTOR
Robert W. Schulte
BY
ATTORNEY

Patented Jan. 18, 1927.

1,614,693

UNITED STATES PATENT OFFICE.

ROBERT W. SCHULTE, OF ST. PAUL, MINNESOTA, ASSIGNOR TO W. R. HEFFELFINGER, OF ST. PAUL, MINNESOTA.

SELF-COMPENSATING FAN BELT.

Application filed May 15, 1925, Serial No. 30,543. Renewed August 27, 1926.

The present invention relates to a belt connection, and more particularly to a resilient connection for a power transmitting belt.

An object of the present invention is to resiliently connect the ends of a power transmitting belt.

Another object is to resiliently retain overlapped end portions of a power transmitting belt in predetermined relation to each other to maintain a resilient tension on the belt.

In order to attain these objects, there is provided in accordance with one feature of the invention, a power transmitting belt, end portions of which are positioned in overlapping relation to each other, and resilient means connecting each of the overlapped ends of said belt to anchor means in spaced relation from the end of the other portion to retain the ends in resilient tension in said overlapped position.

Figure 4:
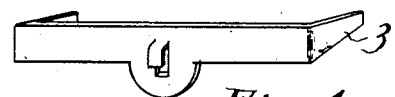
Figure 4, is a view in isometric projection of an anchoring hook which is fastened to an end portion of a belt to hold an end of a spring.

Referring to the drawings in detail, the overlapped end portions A and B, of a power transmitting belt, are provided with anchoring hooks 1 and 2, similar to that shown in Figure 4, which are affixed to the outer surface of the belt in spaced relation from the ends thereof by forcing the legs 3 of said anchoring hooks through the belt material and crimping them over on the inside to firmly grip the belt. A third hook 4 is inserted adjacent the end of the outer belt portion A to receive the hooked end of a spring 5, the other end of which is in engagement with lower retaining hook 2.

Figure 3:
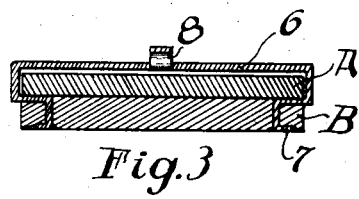
Figure 3, is an enlarged transverse section on the line 3—3 of Figure 1.

A metallic keeper 6 may be shaped as shown in Figure 3, prongs 7 being forced through the lower belt portion B and crimped as shown to firmly grip the belt. The upper looped portion of the keeper 6 is shaped to slidably retain the portion A of the belt therein. A hook 8 is stamped out of the material of the keeper 6 and retains an end of a second spring 9, the other end of said spring being retained by the upper anchoring hook 1. An end of the lower belt portion B is feathered off as shown at 10 to permit smooth and efficient operation of the belt over a pulley, not shown, or other mechanism in performing its functions of a power transmitting belt.

Figure 1:
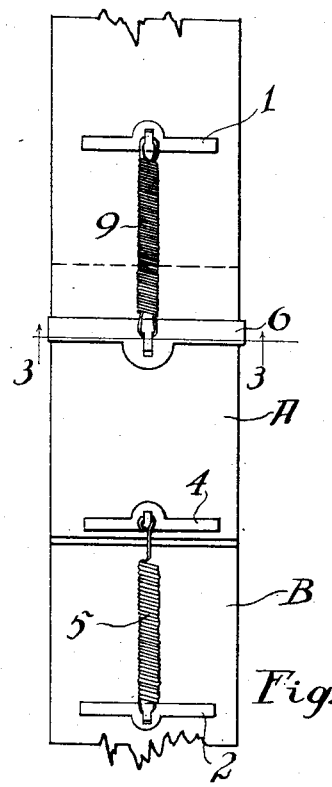
Figure 1, is a view in plan elevation of a pair of overlapped end portions of a belt, held in position in accordance with the present invention.
Figure 2:
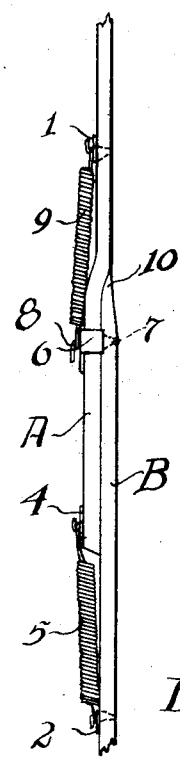
Figure 2, is a view in side elevation of Figure 1.

A contemplated use of the invention is to serve as a belt connection in a fan belt for an automobile motor. It will be noted from Figure 2 that when the portions A and B are pulled apart, the hook 4 will abut against the keeper 6 to prevent the portions from becoming entirely separated, and it is intended when installing a belt that the hook 4 shall be in abutment against keeper 6 so as to permit a maximum amount of compensation by means of the springs 5 and 9 should the belt stretch due to the action of the conditions under which it is operated.

The springs 5 and 9 maintain the belt at a substantially constant tension, irrespective of the degree of heat or cold under which the belt is operated.

After being in use a short time the end 10 becomes pressed snugly into position by running over the pulleys, and operates with the same freedom as a one-piece belt. The belt requires no adjustment, since the resilient members 5 and 9 maintain the belt in a constant state of tension, and it is, therefore, permissible to operate the belt at a much lower initial tension, which prevents distortion of the fibers of the belt in the case of a leather belt, and greatly reduces the wear on the belt, irrespective of the material of which it is composed.

What I claim is:

1. A belt connection, comprising a pair of overlapped portions, anchor means connected to said portions in spaced relation from an end thereof, other anchor means connected to said portions adjacent an end thereof, and resilient means connecting an anchor means adjacent an end of said belt to an anchor means in spaced relation from an end of said belt to retain the overlapped portions in resilient overlapped relation.

2. A belt connection, comprising a pair of overlapped portions, means connected to one of said portions to slidably receive the other portion, and resilient means connected to the receiving means and to an overlapped portion received therein to retain the overlapped portions in resilient relation.

3. In a belt connection, a pair of overlapped belt portions, anchor means secured to each portion in spaced relation from an end thereof, anchor means adjacent an end of one portion, retaining means connected to an end of the other portion to slidably receive the first portion, and resilient means operating between one of the anchoring means, spaced from an end of a belt portion, and said retaining means, and a second resilient means acting between an anchor means adjacent an end of a belt portion and an anchor means in spaced relation from an end of a belt portion, to resiliently retain the belt portions in overlapped relation.

In testimony whereof I affix my signature.

ROBERT W. SCHULTE.